United States Patent
Arai (10) Patent No.: US 7,557,993 B2
(45) Date of Patent: Jul. 7, 2009

(54) OPTICAL PICKUP AND OPTICAL DISC DEVICE

(75) Inventor: Masaki Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/838,393

(22) Filed: Aug. 14, 2007

(65) Prior Publication Data

US 2008/0055734 A1 Mar. 6, 2008

(30) Foreign Application Priority Data

Aug. 30, 2006 (JP) .............................. 2006-233850

(51) Int. Cl.
*G02B 27/14* (2006.01)
(52) U.S. Cl. ..................................... 359/634
(58) Field of Classification Search ......... 359/629–640, 359/718, 719, 720
See application file for complete search history.

(56) References Cited

U.S. PATENT DOCUMENTS 7,352,517 B2 * 4/2008 Kimura ....................... 359/719
2006/0007812 A1 1/2006 Nishi et al.

FOREIGN PATENT DOCUMENTS

| JP | 2005-327338 | * 11/2005 |
| JP | 2006-24333 | 1/2006 |

* cited by examiner

*Primary Examiner*—Ricky L Mack
*Assistant Examiner*—Vipin M Patel
(74) *Attorney, Agent, or Firm*—Oblon, Spivak, McClelland, Maier & Neustadt, P.C.

(57) ABSTRACT

The present invention provides an optical pickup corresponding to plural kinds of optical discs which can be downsized and simplified, and can compensate the spherical aberration. Optical path separation for separating the optical path of a first and a second optical beams as approaching beams to an optical disc 100 into optical paths directed to a first objective lens 51 and a second objective lens 52 corresponding to the optical beams, optical path combination for combining different optical paths of a first and a second reflected optical beams as returning beams which come in from the first and second objective lenses 51, 52, and approach-and-return optical path separation for separating the optical path of the approaching beam and the optical path of the returning beam are realized by the beam separation/composition prism 44. Furthermore, a first collimator lens 45 and a second collimator lens 47 are arranged between the corresponding first and second objective lenses 51, 52 and the beam separation/composition prism 44.

6 Claims, 6 Drawing Sheets

|  | FOCAL DISTANCE OF OBJECTIVE LENS | FOCAL DISTANCE OF COLLIMATOR LENS | MAGNIFYING POWER IN APPROACH OPTICAL PATH |
|---|---|---|---|
| BD | $F_{obj1} = 1.5$ | $F_{col1} = 15.0$ | 1/10 |
| DVD/CD | $F_{obj2} = 2.5$ | $F_{col2} = 12.5$ | 1/5 |

OPTICAL PICKUP AND OPTICAL DISC DEVICE

CROSS REFERENCES TO RELATED APPLICATIONS

The present invention contains subject matter related to Japanese Patent Application JP2006-233850 filed in the Japanese Patent Office on Aug. 30, 2006, the entire contents of which being incorporated herein by reference.

BACKGROUND OF THE INVENTION

1. Field of the Invention

This invention relates to an optical pickup of an optical disc device.

2. Description of the Related Art

In the past, there have been widely diffused optical discs such as Compact Disc (CD) and Digital Versatile Disc (DVD) which use red laser light. On the other hand, so as to meet the demand to increase the recording density and enlarge the storage size, next-generation optical discs such as Blu-ray Disc (registered trademark) using blue laser light of 405 nm in wavelength are being diffused. Accordingly, an optical disc device that is adapted to use three kinds of discs or CD, DVD, Blu-ray Disc (also referred to as BD, hereinafter) is being developed.

In an optical pickup to deal with the plural kinds of discs used in such an optical disc device, in case of employing a configuration in which laser light of three kinds of wavelengths corresponding to the CD, DVD, and BD is irradiated to an objective lens using the identical optical system, the optimum optical magnifying power corresponding to the respective formats of the CD, DVD, and BD is not realized.

Accordingly, there is suggested an optical pickup having an optical system provided with two collimator lenses and two objective lenses which have different focal distances (for example, refer to Patent Document 1: Jpn. Pat. Appln. Laid-Open Publication No. 2006-24333).

Figure 1:
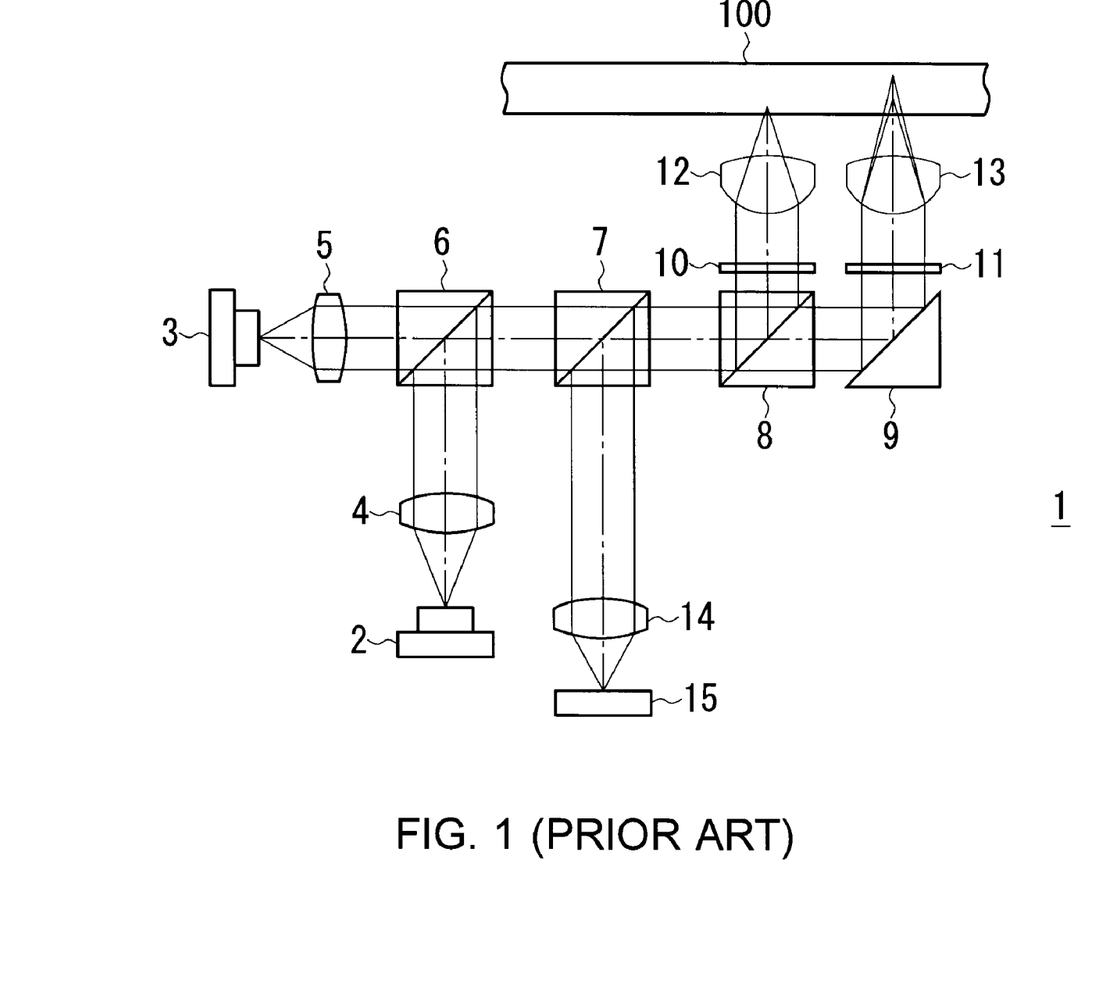
FIG. 1 shows a schematic view indicative of the configuration of a conventional optical pickup.

FIG. 1 shows a schematic view of an optical pickup 1 of this configuration, which includes a two-wavelength laser diode 2 that irradiates laser light of 405 nm in wavelength or laser light of 660 nm in wavelength as an optical beam for BD or an optical beam for DVD respectively, a single-wavelength laser diode 3 that irradiates laser light of 780 nm in wavelength as an optical beam for CD, a BD objective lens 12 that converges an optical beam for BD to output thus converged beam to an optical disc 100, and a DVD/CD objective lens 13 that converges an optical beam for DVD or an optical beam for CD to output thus converged beam to the optical disc 100.

The optical pickup 1 further includes a first collimator lens 4 that sets an optical beam for BD or an optical beam for DVD output from the two-wavelength laser diode 2 to a parallel beam to output the resulting beam to a first beam splitter 6. On the other hand, the optical pickup 1 further includes a second collimator lens 5 that sets an optical beam for CD output from the single-wavelength laser diode 3 to a parallel beam to output the resulting beam to the first beam splitter 6.

The first beam splitter 6 reflects an optical beam for BD or an optical beam for DVD at a right angle according to the wavelength thereof, while transmits an optical beam for CD according to the wavelength thereof, and makes the optical beam input to a polarization beam splitter 7. The polarization beam splitter 7 transmits an optical beam for BD, DVD, or CD according to the polarization direction thereof, and makes the optical beam input to a second beam splitter 8.

The second beam splitter 8 reflects an optical beam for BD at a right angle according to the wavelength thereof, and makes the optical beam input to the BD objective lens 12 through a quarter wavelength plate 10, while transmits an optical beam for DVD or an optical beam for CD according to the wavelength thereof, and makes the optical beam input to the DVD/CD objective lens 13 through a upturning mirror 9 and a quarter wavelength plate 11.

The BD objective lens 12 condenses an optical beam for BD to output thus condensed beam to the recording surface of the optical disc 100, and receives a reflected optical beam for BD which is reflected by the recording surface to make the beam input to the polarization beam splitter 7 through the quarter wavelength plate 10 and second beam splitter 8. On the other hand, the DVD/CD objective lens 13 condenses an optical beam for DVD or an optical beam for CD to output thus condensed beam to the recording surface of the optical disc 100, and receives a reflected optical beam for DVD or a reflected optical beam for CD which is reflected by the recording surface to make the beam input to the polarization beam splitter 7 through the quarter wavelength plate 11, upturning mirror 9, and second beam splitter 8.

The polarization beam splitter 7 reflects a reflected optical beam for BD, a reflected optical beam for DVD, or a reflected optical beam for CD according to the polarization direction thereof, and makes the optical beam input to an adjustment lens 14. Then, the adjustment lens 14 condenses a reflected optical beam for BD, a reflected optical beam for DVD, or a reflected optical beam for CD to output thus condensed beam to a light receiving element 15.

Figure 2:
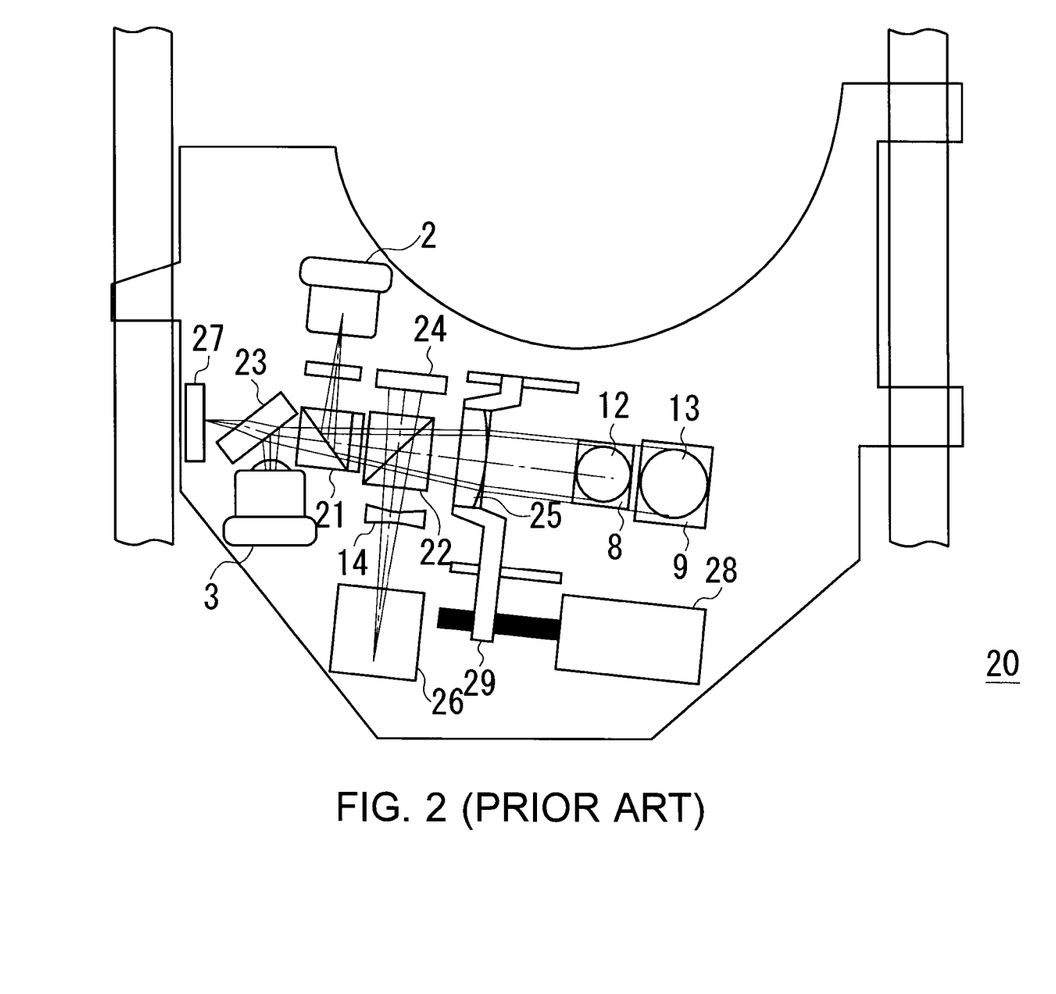
FIG. 2 shows a schematic view indicative of the configuration of another conventional optical pickup.

FIG. 2 shows a schematic view of an optical pickup 20 of another configuration, in which parts or components similar to those in FIG. 1 are indicated with the same reference numerals.

The optical pickup 20, which is different from the optical pickup 1 shown in FIG. 1, includes a collimator lens 25 that is in shared use for an optical beam for BD, DVD, or CD.

The optical pickup 20 includes a first polarization beam splitter 21 that reflects an optical beam for BD or an optical beam for DVD irradiated from the two-wavelength laser diode 2 at a right angle, and makes the optical beam input to a second polarization beam splitter 22. On the other hand, a half mirror 23 reflects an optical beam for CD irradiated from the single-wavelength laser diode 3, and makes the optical beam input to the second polarization beam splitter 22 through the first polarization beam splitter 21.

The second polarization beam splitter 22 reflects part of an optical beam for BD, an optical beam for DVD, or an optical beam for CD, and makes the part of optical beam input to a light receiving element 24 for a laser power monitor, while transmits the other part of optical beam to make the beam input to the collimator lens 25.

The collimator lens 25 sets an input optical beam for BD, optical beam for DVD, or optical beam for CD to a parallel beam to output the resulting beam to the beam splitter 8.

The beam splitter 8 reflects an optical beam for BD at a right angle according to the wavelength thereof, and makes the optical beam input to the BD objective lens 12, while transmits an optical beam for DVD or an optical beam for CD according to the wavelength thereof, and makes the optical beam input to the DVD/CD objective lens 13 through the upturning mirror 9.

The BD objective lens 12 condenses an optical beam for BD to output thus condensed beam to the recording surface of the optical disc 100, and receives a reflected optical beam for BD which is reflected by the recording surface to make the beam input to the collimator lens 25 through the beam splitter 8. On the other hand, the DVD/CD objective lens 13 condenses an optical beam for DVD or an optical beam for CD to output thus condensed beam to the recording surface of the optical disc 100, and receives a reflected optical beam for DVD or a reflected optical beam for CD which is reflected by the recording surface to make the beam input to the collimator lens 25 through the upturning mirror 9 and beam splitter 8.

The collimator lens 25 sets a reflected optical beam for BD, reflected optical beam for DVD, or reflected optical beam for CD to a converged beam to make the resulting beam input to the second polarization beam splitter 22. The second polarization beam splitter 22 reflects a reflected optical beam for BD, and makes the optical beam input to a BD light receiving element 26 through the adjustment lens 14. Furthermore, the second polarization beam splitter 22 transmits a reflected optical beam for DVD or a reflected optical beam for CD, and makes the optical beam input to a DVD/CD light receiving element 27 through the first polarization beam splitter 21 and half mirror 23.

The collimator lens 25 is attached to a lens holder 29 that is driven back and forth by a motor 28 in the optical axis direction. Accordingly, the optical pickup 20 can compensate the spherical aberration with respect to BD or DVD by shifting the collimator lens 25 in the optical axis direction.

SUMMARY OF THE INVENTION

However, in the configuration of the optical pickup 1 shown in FIG. 1, since the first collimator lens 4 is arranged between the two-wavelength laser diode 2 and the first beam splitter 6 as approach-and-return optical path separation means for separating the approach-and-return optical path, when the first collimator lens 4 is shifted in the optical axis direction so as to compensate the spherical aberration, the state of condensing a reflected optical beam on the light receiving element is changed, which raises a problem that the aberration is unable to be compensated by shifting the first collimator lens 4.

On the other hand, in the configuration of the optical pickup 20 shown in FIG. 2, since the collimator lens 25 is arranged between the second polarization beam splitter 22 as approach-and-return optical path separation means and the beam splitter 8 as beam separation means for separating the optical path to the two objective lenses 12, 13, even if the collimator lens 25 is shifted in the optical axis direction to compensate the spherical aberration, since the collimator lens 25 is located between the second polarization beam splitter 22 and the second beam splitter 8, the second polarization beam splitter 22 and second beam splitter 8 are unable to be united, which raises a problem that it is difficult to downsize and simplify the entire optical pickup 20.

It is therefore desirable to overcome the above-mentioned drawbacks by providing an optical pickup corresponding to plural kinds of optical discs which can be downsized and simplified, and can compensate the spherical aberration, and an optical disc device using the optical pickup.

According to an embodiment of the present invention, there is provided an optical pickup including: beam separation/composition means for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element; a first collimator lens that is arranged between the beam separation/composition means and the first objective lens; and a second collimator lens that is arranged between the beam separation/composition means and the second objective lens.

Accordingly, optical path separation for separating the optical path of a first and a second optical beams as approaching beams to an optical disc into optical paths directed to a first objective lens and a second objective lens corresponding to the optical beams, optical path combination for combining different optical paths of a first and a second reflected optical beams as returning beams which come in from the first and second objective lenses, and approach-and-return optical path separation for separating the optical path of the approaching beam and the optical path of the returning beam are realized by the beam separation/composition means. Furthermore, since a first and a second collimator lenses are arranged between the corresponding first and second objective lenses and the beam separation/composition means, the first and second collimator lenses can be located on the optical path of the approaching beam and the optical path of the returning beam, which makes it possible to compensate the aberration by shifting the collimator lenses in the optical axis direction.

According to the present invention, there is provided an optical pickup which includes beam separation/composition means for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element, a first collimator lens that is arranged between the beam separation/composition means and the first objective lens, and a second collimator lens that is arranged between the beam separation/composition means and the second objective lens. Accordingly, optical path separation for separating the optical path of a first and a second optical beams as approaching beams to an optical disc into optical paths directed to a first objective lens and a second objective lens corresponding to the optical beams, optical path combination for combining different optical paths of a first and a second reflected optical beams as returning beams which come in from the first and second objective lenses, and approach-and-return optical path separation for separating the optical path of the approaching beam and the optical path of the returning beam are realized by the beam separation/composition means. Furthermore, since a first and a second collimator lenses are arranged between the corresponding first and second objective lenses and the beam separation/composition means, the first and second collimator lenses can be located on the optical path of the approaching beam and the optical path of the returning beam, which makes it possible to compensate the aberration by shifting the collimator lenses in the optical axis direction. Accordingly, it becomes possible to provide an optical pickup which can be downsized and simplified and can compensate the spherical aberration, and an optical disc device using the optical pickup.

The nature, principle and utility of the invention will become more apparent from the following detailed descrip-

DETAILED DESCRIPTION OF THE PREFERRED EMBODIMENTS

Referring to the accompanying drawings, an embodiment of the present invention will further be described below.

(1) Entire Configuration of Optical Disc Device

Figure 3:
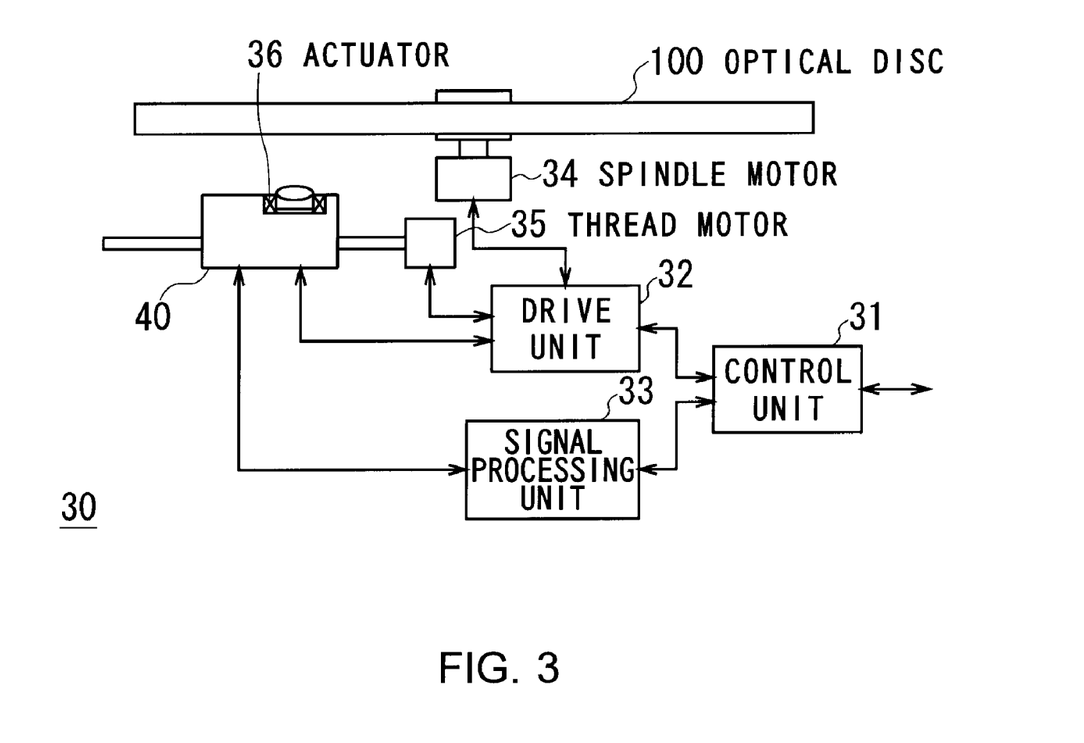
FIG. 3 shows a block diagram indicative of the entire configuration of an optical disc device.

FIG. 3 shows a block diagram indicative of the entire configuration of an optical disc device 30, which is totally controlled by a control unit 31. The optical disc device 30 is adapted to read out information recorded on an optical disc 100 by making the control unit 31 control a drive unit 32 and a signal processing unit 33 when receiving a reproduction designation etc. from an external device, not shown, with the optical disc 100 loaded therein.

Actually, under the control of the control unit 31, the drive unit 32 makes a spindle motor 34 rotate the optical disc 100 at a desired rotational speed, and makes a thread motor 35 widely shift an optical pickup 40 in the tracking direction being the radius direction of the optical disc 100, and further makes a lens actuator 36 finely shift an objective lens in two directions, or the focusing direction being a direction of coming close to or getting away from the optical disc 100 as well as the tracking direction.

Concurrently, the signal processing unit 33 makes the optical pickup 40 irradiate an optical beam of a wavelength corresponding to the kind of the loaded optical disc 100 to desired tracks of the optical disc 100 through the objective lens thereof, and generates a reproduction signal based on the result of detecting a reflected optical beam, and sends thus generated reproduction signal to an external device, not shown, through the control unit 31.

(2) Configuration of Optical Pickup

Next, the configuration of the optical pickup 40 will be explained with reference to FIG. 4. The optical pickup 40 includes a single-wavelength laser diode 41 that irradiates S-polarized laser light of 405 nm in wavelength as an optical beam for BD, a two-wavelength laser diode 42 that irradiates P-polarized laser light of 660 nm in wavelength or P-polarized laser light of 780 nm in wavelength as an optical beam for DVD or an optical beam for CD respectively, a BD objective lens 51 that converges an optical beam for BD to output thus converged beam to the optical disc 100, and a DVD/CD objective lens 52 that converges an optical beam for DVD or an optical beam for CD to output thus converged beam to the optical disc 100.

Firstly, the optical path of an optical beam for BD will be explained. The optical pickup 40 further includes a beam composition prism 43 as beam separation means that has a reflection surface 43A which has its optical characteristics so selected as to reflect an optical beam for BD, while transmits an optical beam for DVD and an optical beam for CD. Accordingly, the beam composition prism 43 reflects an S-polarized optical beam for BD irradiated from the single-wavelength laser diode 41 according to the wavelength thereof using the reflection surface 43A, and makes the optical beam input to a beam separation/composition prism 44.

The beam separation/composition prism 44 has a reflection surface 44A which has its optical characteristics so selected as to reflect an S-polarized optical beam, while transmits a P-polarized optical beam. Accordingly, the beam separation/composition prism 44 reflects an S-polarized optical beam for BD according to the polarization direction thereof using the reflection surface 44A, and makes the optical beam input to a BD collimator lens 45 through a reflection surface 44B.

The BD collimator lens 45 sets an optical beam for BD to a parallel beam, and the paralleled beam is converted from the S-polarization to the circular polarization using a quarter wavelength plate 46, and the resulting beam is made to input to a BD objective lens 51. Then, the BD objective lens 51 converges an optical beam for BD to output thus converged beam to the recording surface of the optical disc 100, and receives a reflected optical beam for BD which is reflected by the recording surface to set the beam to a parallel beam, and makes the beam input to the BD collimator lens 45 through the quarter wavelength plate 46.

The BD collimator lens 45 sets a reflected optical beam for BD, which passes through the quarter wavelength plate 46 to be converted from the circular polarization to the P-polarization, to a converged beam, and makes the resulting beam input to the beam separation/composition prism 44. As described above, since the reflection surface 44A of the beam separation/composition prism 44 reflects an S-polarized optical beam and transmits a P-polarized optical beam, the reflection surface 44A of the beam separation/composition prism 44 transmits a P-polarized reflected optical beam for BD, and a cylindrical lens 49 condenses the transmitted beam to a light receiving element 50, and then the light receiving element 50 generates various signals.

Secondly, the optical path of an optical beam for DVD and CD will be explained. As described above, since the reflection surface 43A of the beam composition prism 43 has its optical characteristics so selected as to reflect an optical beam for BD and transmit an optical beam for DVD and an optical beam for CD, the beam composition prism 43 transmits a P-polarized optical beam for DVD or CD irradiated from the two-wavelength laser diode 42 according to the polarization direction thereof, and makes the transmitted beam input to the beam separation/composition prism 44.

Since the reflection surface 44A of the beam separation/composition prism 44 has its optical characteristics so selected as to reflect an S-polarized optical beam and transmit a P-polarized optical beam, the beam separation/composition prism 44 transmits a P-polarized optical beam for DVD or CD according to the polarization direction thereof, and makes the transmitted beam input to a DVD/CD collimator lens 47.

The DVD/CD collimator lens 47 sets an optical beam for DVD or CD to a parallel beam, and the paralleled beam is converted from the P-polarization to the circular polarization using a quarter wavelength plate 48, and the resulting beam is made to input to the DVD/CD objective lens 52. Then, the DVD/CD objective lens 52 converges an optical beam for DVD or CD to output thus converged beam to the recording surface of the optical disc 100, and receives a reflected optical beam for DVD or CD which is reflected by the recording surface to set the beam to a parallel beam, and makes the beam input to the DVD/CD collimator lens 47 through the quarter wavelength plate 48.

The DVD/CD collimator lens 47 sets a reflected optical beam for DVD or CD, which passes through the quarter wavelength plate 48 to be converted from the circular polarization to the S-polarization, to a converged beam, and makes the resulting beam input to the beam separation/composition prism 44. The reflection surface 44A of the beam separation/composition prism 44 reflects an S-polarized reflected optical beam for DVD or CD, and the cylindrical lens 49 condenses the reflected beam to the light receiving element 50, and then the light receiving element 50 generates various signals.

The BD collimator lens 45 and DVD/CD collimator lens 47 are attached to a lens holder 52 that is driven back and forth by an actuator, not shown, in the optical axis direction. The control unit 31 shown in FIG. 3 offsets the spherical aberration which fluctuates according to the thickness etc. of the cover layer with the spherical aberration which is raised by shifting the BD collimator lens 45 and DVD/CD collimator lens 47 in the optical axis direction.

(3) Performance and Effect

In above described configuration, in the optical pickup 40 according to an embodiment of the present invention, the beam separation/composition prism 44 separates the identical optical path of an incoming optical beam for BD and an incoming optical beam for DVD and CD into optical paths directed to corresponding objective lenses, and combines optical paths of a reflected optical beam for BD and a reflected optical beam for DVD and CD which come in along the different optical paths from the corresponding objective lenses so as to output the reflected optical beam in a direction different from a direction along which the optical beam for BD or optical beam for DVD or CD comes in to make the reflected optical beam input to the light receiving element 50.

In this way, the beam separation/composition prism 44 of the optical pickup 40 is provided with an optical path separation function of separating the identical optical path of an incoming optical beam for BD and an incoming optical beam for DVD and CD into optical paths directed to corresponding objective lenses, and an optical path combination function of combining optical paths of a reflected optical beam for BD and a reflected optical beam for DVD and CD which come in along the different optical paths from the corresponding objective lenses, and an approach-and-return optical path separation function of separating the optical path of a reflected optical beam for BD, DVD, or CD as a returning beam from an optical disc and the optical path of an optical beam for BD, DVD, or CD as an approaching beam to the optical disc.

Accordingly, by employing the single beam separation/composition prism 44, the optical pickup 40 according to an embodiment of the present invention can realize the approach-and-return optical path separation function which is necessary in receiving a reflected optical beam to generate a detection signal, and the optical path separation function and the optical path combination function which are necessary when using a plurality of objective lenses corresponding to the kind of beam.

In addition, in the optical pickup 40, the BD collimator lens 45 and DVD/CD collimator lens 47 are arranged between the beam separation/composition prism 44 and the BD objective lens 51 and DVD/CD objective lens 52. Accordingly, since the collimator lenses 45, 47 are located on the optical path of an approaching beam (optical beam for BD, DVD, or CD) as well as on the optical path of a returning beam (reflected optical beam for BD, DVD, or CD), even if the collimator lenses 45, 47 are shifted in the optical axis direction so as to compensate the aberration, the state of condensing a reflected optical beam on the light receiving element 50 can be desirably maintained.

Next, the focal distance of the BD collimator lens 45 and DVD/CD collimator lens 47 will be explained. In general, since the numerical aperture of an objective lens in an optical disc device is set to approximately 0.85 for BD, approximately 0.65 for DVD, and approximately 0.51 for CD, due to the relationship of assuring light amount of optical beam and assuring image formation function, in many cases, the magnifying power in the approach optical path in the respective optical systems is set to approximately $1/12$ to $1/9$ for BD, approximately $1/7$ to $1/5$ for DVD, and approximately $1/4.5$ to $1/3.5$ for CD.

Accordingly, even if it is necessary to enlarge the magnifying power in the approach optical path in the optical systems for DVD and CD as compared with the optical system for BD, in the optical pickup 40 according to an embodiment of the present invention, since the BD collimator lens 45 and BD objective lens 51, and DVD/CD collimator lens 47 and DVD/CD objective lens 52 are independently arranged, it becomes possible to properly set up the magnifying power in the approach optical path in the respective optical systems.

Specifically, when it is determined that the focal distance of the BD objective lens 51 is Fobj1, the focal distance of the DVD/CD objective lens 52 is Fobj2, the focal distance of the BD collimator lens 45 is Fcol1, and the focal distance of the DVD/CD collimator lens 47 is Fcol2, by designing the focal distance Fcol2 of the DVD/CD collimator lens 47 such that the following mathematical expression $$Fcol2 < Fcol1 * Fobj2 / Fobj1 \qquad (1)$$

is satisfied, the magnifying power in the approach optical path suitable for the respective optical systems can be realized. FIG. 5 shows an example of a table indicative of the combination of the focal distances of objective lenses and the focal distances of collimator lenses.

According to above-describe configuration, by arranging the beam separation/composition prism 44 which is provided with an optical path separation function of separating the optical path of the approaching beams into optical paths directed to corresponding objective lenses, and an optical path combination function of combining optical paths of the returning beams which come in along the different optical paths from the corresponding objective lenses, and an approach-and-return optical path separation function of separating the optical path of the returning beam and the optical path of the approaching beam, the entire optical pickup 40 can be downsized and simplified. Furthermore, since the collimator lenses 45, 47 are arranged between the beam separation/composition prism 44 and the objective lenses 51, 52, the collimator lenses 45, 47 are located on the optical path of the approach optical path as well as on the optical path of the return optical path, which makes it possible to compensate the aberration by shifting the collimator lenses 45, 47 in the optical axis direction.

(4) Another Embodiment

In above-described embodiment, an optical beam for BD is irradiated from the single-wavelength laser diode 41, and an optical beam for DVD or an optical beam for CD is irradiated from the two-wavelength laser diode 42, to which the present invention is not restricted, and an optical beam for BD, an optical beam for DVD, or an optical beam for CD may be irradiated from a shared three-wavelength laser diode.

Figure 6:
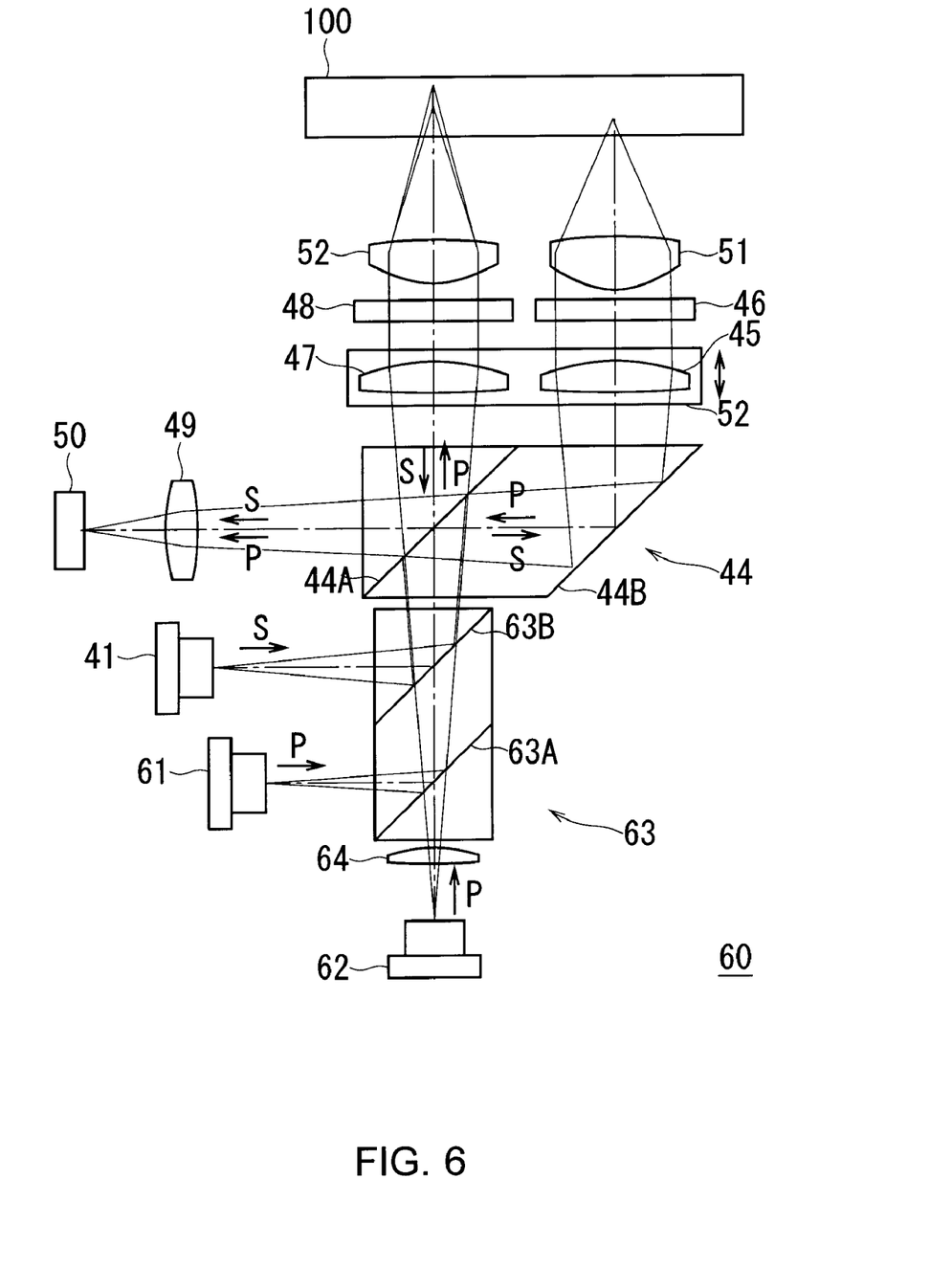
FIG. 6 shows a schematic view indicative of the configuration of an optical pickup according to another embodiment of the present invention.

Furthermore, an optical beam for BD, an optical beam for DVD, or an optical beam for CD may be irradiated from individual laser diodes respectively. FIG. 6 shows an optical pickup 60 of this configuration, in which parts or components similar to those shown in FIG. 4 are indicated with the same reference numerals. As shown, the optical pickup 60 includes a BD laser diode 41 that irradiates S-polarized laser light of 405 nm in wavelength as an optical beam for BD, a DVD laser diode 61 that irradiates P-polarized laser light of 660 nm in wavelength as an optical beam for DVD, and a CD laser diode 62 that irradiates laser light of 780 nm in wavelength as an optical beam for CD.

The optical pickup 60 further includes a beam composition prism 63 that has a reflection surface 63A which has its optical characteristics so selected as to reflect an optical beam for DVD of 660 nm in wavelength, while transmits an optical beam for CD of 780 nm in wavelength.

Accordingly, the beam composition prism 63 transmits an optical beam for CD irradiated from the CD laser diode 62 to make the optical beam input to a reflection surface 63B, while reflects an optical beam for DVD irradiated from the DVD laser diode 61 to make the optical beam input to the reflection surface 63B along the identical optical path as the optical beam for CD.

Figure 4:
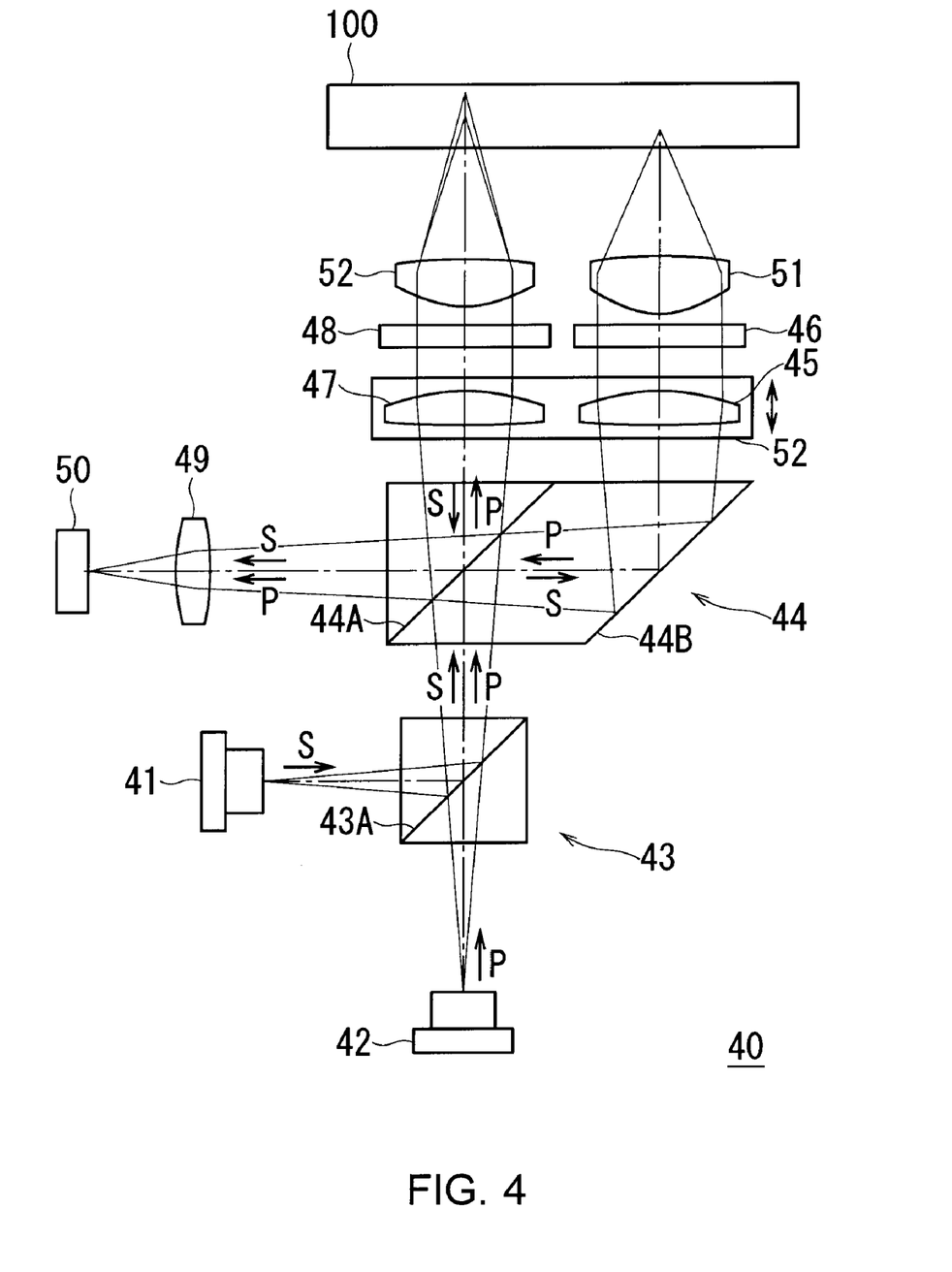
FIG. 4 shows a schematic view indicative of the configuration of an optical pickup according to an embodiment of the present invention.
Figure 5:
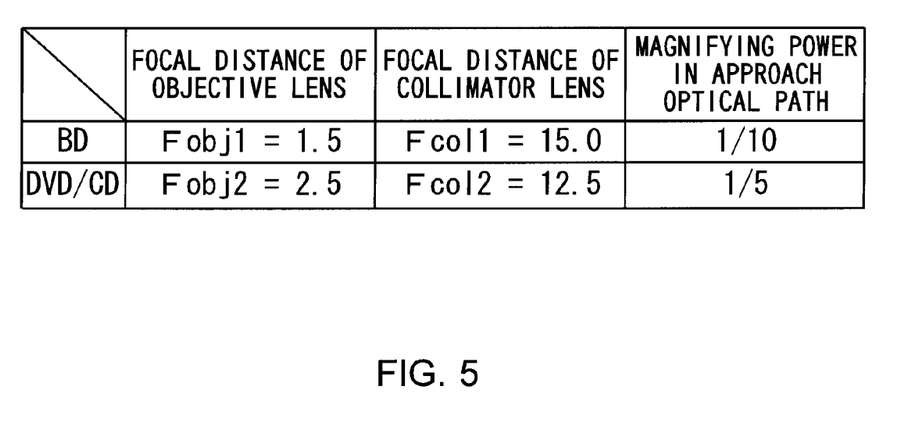
FIG. 5 shows a table indicative of the relationship between the focal distance and the magnifying power.

Similar to the reflection surface 43A of the beam composition prism 43 shown in FIG. 4, the reflection surface 63B of the beam composition prism 63 has its optical characteristics so selected as to reflect an optical beam for BD, while transmits an optical beam for DVD and an optical beam for CD. Accordingly, the beam composition prism 63 makes an optical beam for BD, an optical beam for DVD, or an optical beam for CD input to the beam separation/composition prism 44 using the identical optical path.

Furthermore, in the optical pickup 60, a coupling lens 64 is arranged on the optical path of an optical beam for CD. Since this coupling lens 64 is provided with a function of changing magnifying power, the magnifying power in the approach optical path for an optical beam for CD can be set up independently of the magnifying power in the approach optical path for an optical beam for DVD. Accordingly, in the optical pickup 60, the magnifying power in the approach optical path of the respective optical systems (that is, for an optical beam for BD, DVD, and CD) can be set up optimally.

In above-described embodiments, the reflection surface 44A of the beam separation/composition prism 44 has its optical characteristics so selected as to reflect an S-polarized optical beam, while transmits a P-polarized optical beam. Furthermore, the reflection surface 43A of the beam composition prism 43 and the reflection surface 63B of the beam composition prism 63 have their optical characteristics so selected as to reflect an optical beam for BD, while transmits an optical beam for DVD and an optical beam for CD. On the other hand, the present invention is not restricted to this, and the reflection surfaces 44A, 43A, and 63B may be provided with both the wavelength selectivity and polarization selectivity.

Furthermore, in above-described embodiments, the BD collimator lens 45 and DVD/CD collimator lens 47 are attached to the lens holder 52, and the aberration is compensated by shifting both the BD collimator lens 45 and DVD/CD collimator lens 47 in the optical axis direction, to which the present invention is not restricted, and the aberration may be compensated by shifting any one of the BD collimator lens 45 and DVD/CD collimator lens 47 in the optical axis direction. That is, the aberration may be compensated by shifting only a collimator lens of an optical system, which has to perform aberration compensation, in the optical axis direction.

Furthermore, in above-described embodiments, the present invention is applied to an optical pickup corresponding to three kinds of optical discs or BD, DVD, and CD, to which the present invention is not restricted, and the present invention can be applied to various kinds of optical pickups having a plurality of objective lenses and corresponding to a plurality of kinds of optical discs such as an optical pickup corresponding to two kinds of optical discs or BD and DVD, and an optical pickup corresponding to four kinds of optical discs or BD, DVD, CD, and HD-DVD.

Furthermore, in above-described embodiments, an optical beam for BD is converged by the dedicated BD objective lens 51 to be output to the optical disc 100, and an optical beam for DVD or an optical beam for CD is converged by the shared DVD/CD objective lens 52 to be output to the optical disc 100, to which the present invention is not restricted, and, as an example of an optical pickup corresponding to HD-DVD, an optical beam for BD may be converged by a dedicated objective lens, and an optical beam for DVD, an optical beam for CD, or an optical beam for HD-DVD may be converged by a shared dedicated objective lens.

Furthermore, in above-described embodiments, the present invention is applied to the optical pickup 40 of the optical disc device 30, to which the present invention is not restricted, and the present invention can be applied to other various kinds of optical pickups 40. That is, the optical pickup 40 is not restricted to that which is built in the optical disc device 30.

The present invention can be applied to various kinds of optical pickups corresponding to a plurality of kinds of optical discs.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
   beam separation/composition means for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element;
   a first collimator lens that is arranged between the beam separation/composition means and the first objective lens; and
   a second collimator lens that is arranged between the beam separation/composition means and the second objective lens,
   wherein, when it is determined that the focal distance of the first objective lens is Fobj1, the focal distance of the second objective lens is Fobj2, the focal distance of the first collimator lens is Fcol1, and the focal distance of the second collimator lens is Fcol2, the following mathematical expression is satisfied, $Fcol2 < Fcol1 * Fobj2/Fobj1.$ 2. The optical pickup according to claim 1, wherein the beam separation/composition means is arranged on the optical path of the first optical beam and the second optical beam which are divergent beams.

3. The optical pickup according to claim 1, further comprising:
drive means for driving at least any one of the first collimator lens and the second collimator lens in the optical axis direction.

4. An optical disc device using an optical pickup, the optical pickup comprising:
beam separation/composition means for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element;
a first collimator lens that is arranged between the beam separation/composition means and the first objective lens; and
a second collimator lens that is arranged between the beam separation/composition means and the second objective lens,
wherein, when it is determined that the focal distance of the first objective lens is Fobj1, the focal distance of the second objective lens is Fobj2, the focal distance of the first collimator lens is Fcol1, and the focal distance of the second collimator lens is Fcol2, the following mathematical expression is satisfied, $Fcol2 < Fcol1 * Fobj2/Fobj1.$ 5. An optical pickup comprising:
beam separation/composition prism for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element;
a first collimator lens that is arranged between the beam separation/composition prism and the first objective lens; and
a second collimator lens that is arranged between the beam separation/composition prism and the second objective lens,
wherein, when it is determined that the focal distance of the first objective lens is Fobj1, the focal distance of the second objective lens is Fobj2, the focal distance of the first collimator lens is Fcol1, and the focal distance of the second collimator lens is Fcol2, the following mathematical expression is satisfied, $Fcol2 < Fcol1 * Fobj2/Fobj1.$ 6. An optical disc device using an optical pickup, the optical pickup comprising:
beam separation/composition prism for separating the identical optical path of an incoming first optical beam and an incoming second optical beam into optical paths directed to a first objective lens and a second objective lens corresponding to the optical beams respectively, and combining optical paths of a first reflected optical beam and a second reflected optical beam which are brought about when the first optical beam and the second optical beam are reflected by an optical disc respectively so as to output the reflected optical beam along an optical path different from the optical path of the first optical beam and the second optical beam toward a light receiving element;
a first collimator lens that is arranged between the beam separation/composition prism and the first objective lens; and
a second collimator lens that is arranged between the beam separation/composition prism and the second objective lens,
wherein, when it is determined that the focal distance of the first objective lens is Fobj1, the focal distance of the second objective lens is Fobj2, the focal distance of the first collimator lens is Fcol1, and the focal distance of the second collimator lens is Fcol2, the followin mathematical expression is satisfied, $Fcol2 < Fcol1 * Fobj2/Fobj1.$

* * * * *